US010982029B2

(12) United States Patent
Nakano et al.

(10) Patent No.: US 10,982,029 B2
(45) Date of Patent: Apr. 20, 2021

(54) ACRYLIC RUBBER COMPOSITION

(71) Applicants: DENKA COMPANY LIMITED, Tokyo (JP); INDIAN INSTITUTE OF TECHNOLOGY KHARAGPUR, West Bengal (IN)

(72) Inventors: Tatsuya Nakano, Ichihara (JP); Takashi Kawasaki, Ichihara (JP); Toshiaki Miyauchi, Ichihara (JP); Tatsunori Horiguchi, Ichihara (JP); Tuhin Saha, West Bengal (IN); Anil K. Bhowmick, West Bengal (IN)

(73) Assignees: DENKA COMPANY LIMITED, Tokyo (JP); INDIAN INSTITUTE OF TECHNOLOGY KHARAGPUR, West Bengal (IN)

( * ) Notice: Subject to any disclaimer, the term of this patent is extended or adjusted under 35 U.S.C. 154(b) by 123 days.

(21) Appl. No.: 16/307,845

(22) PCT Filed: Jun. 27, 2017

(86) PCT No.: PCT/JP2017/023568
§ 371 (c)(1),
(2) Date: Dec. 6, 2018

(87) PCT Pub. No.: WO2018/008473
PCT Pub. Date: Jan. 11, 2018

(65) Prior Publication Data
US 2019/0300633 A1 Oct. 3, 2019

(30) Foreign Application Priority Data
Jul. 5, 2016 (JP) ............... JP2016-133544

(51) Int. Cl.
*C08K 3/34* (2006.01)
*C08F 210/02* (2006.01)
*C08F 220/12* (2006.01)
*C08L 33/08* (2006.01)
*C08L 33/10* (2006.01)
*B29D 23/00* (2006.01)
*C09K 3/10* (2006.01)
*F16L 11/04* (2006.01)
*G10K 11/162* (2006.01)
*C09K 3/00* (2006.01)
*C08L 33/06* (2006.01)

(52) U.S. Cl.
CPC ............. *C08F 220/12* (2013.01); *C08K 3/34* (2013.01); *C08K 3/346* (2013.01); *C08L 33/06* (2013.01); *C09K 3/00* (2013.01); *C09K 3/10* (2013.01); *F16L 11/04* (2013.01); *G10K 11/162* (2013.01); *B29D 23/00* (2013.01); *C08F 210/02* (2013.01); *C08F 2800/20* (2013.01); *C08L 33/08* (2013.01); *C08L 33/10* (2013.01); *C09K 2200/0607* (2013.01)

(58) Field of Classification Search
None
See application file for complete search history.

(56) References Cited

U.S. PATENT DOCUMENTS

| 8,383,220 | B2 | 2/2013 | Kawasaki et al. |
|---|---|---|---|
| 10,086,593 | B2 | 10/2018 | Kawasaki et al. |
| 2007/0179228 | A1 | 8/2007 | Yoshida et al. |
| 2013/0023617 | A1* | 1/2013 | Okamoto ............ C08K 5/57 524/425 |
| 2015/0035235 | A1 | 2/2015 | Tsuda |

FOREIGN PATENT DOCUMENTS

| CN | 1536021 A | 10/2004 |
|---|---|---|
| CN | 1752112 A | 3/2006 |
| CN | 101475714 A | 7/2009 |
| CN | 101724187 A | 6/2010 |
| CN | 102124040 A | 7/2011 |
| CN | 102942759 A | 2/2013 |
| CN | 103739900 A | 4/2014 |
| CN | 104130541 A | 11/2014 |
| CN | 104341702 A | 2/2015 |
| CN | 103842173 B | 3/2016 |
| EP | 0957127 A1 | 11/1999 |
| EP | 2246373 A1 | 11/2010 |
| EP | 2762306 A1 | 8/2014 |
| EP | 2924055 A1 | 9/2015 |
| JP | 2001-116173 A | 4/2001 |
| JP | 2001-131236 A | 5/2001 |
| JP | 2002-032583 A | 1/2002 |
| JP | 2002-302583 A | 10/2002 |
| JP | 2003-327751 | 11/2003 |
| JP | 3464752 B2 | 11/2003 |
| JP | 2007-056095 A | 3/2007 |
| JP | 2008-021903 A | 1/2008 |
| JP | 2008-081620 A | 4/2008 |
| JP | 2008081620 A * | 4/2008 |
| JP | 2008-201903 A | 9/2008 |

(Continued)

OTHER PUBLICATIONS

PCT/ISA/210, "International Search Report for International Application No. PCT/JP2017/023568," dated Sep. 5, 2017.

(Continued)

*Primary Examiner* — Richard A Huhn
(74) *Attorney, Agent, or Firm* — Manabu Kanesaka

(57) ABSTRACT

Provided are an acrylic rubber composition having higher tensile properties and higher heat resistance and a vulcanizate thereof. An acrylic rubber composition includes 1 to 25 parts by mass of a layered clay mineral relative to 100 parts by mass of an acrylic rubber. The acrylic rubber is a copolymer of a (meth)acrylic acid alkyl ester and a curesite monomer.

12 Claims, No Drawings

(56) References Cited

FOREIGN PATENT DOCUMENTS

| JP | 2008201903 A | * | 9/2008 |
| JP | 2012-211239 A | | 11/2012 |
| JP | 5419948 B2 | | 2/2014 |

OTHER PUBLICATIONS

Europe Patent Office, "Search Report for European Patent Application No. 17824079.2," dated Jan. 14, 2020.

* cited by examiner

ACRYLIC RUBBER COMPOSITION

RELATED APPLICATIONS

The present application is National Phase of International Application No. PCT/JP2017/023568 filed Jun. 27, 2017, and claims priority from Japanese Application No. 2016-133544, filed Jul. 5, 2016, the disclosure of which is hereby incorporated by reference herein in its entirety.

TECHNICAL FIELD

The present invention relates to an acrylic rubber composition having higher tensile properties and higher heat resistance and use thereof.

BACKGROUND ART

To meet recent demands for higher performance and higher functions, attempts to uniformly disperse various fillers in a polymer have been performed to impart various characteristics.

For example, in Patent Document 1, a small amount of boron nitride powder is dispersed as a thermal conductive filler in a silicone rubber molded article to impart high thermal conductivity while rubber flexibility is maintained.

Patent Document 2 discloses a resin sealed semiconductor device in which an inorganic filler is added to an epoxy resin to impart insulating properties.

Patent Document 3 discloses a nanocomposite in which a nanosized filler such as a layered clay mineral is dispersed in a diene rubber to improve physical properties including disruptive strength and flexural fatigue resistance.

CITATION LIST

Patent Documents

Patent Document 1: Japanese Patent No. 3464752
Patent Document 2: Japanese Patent No. 5419948
Patent Document 3: JP-A No. 2003-327751

SUMMARY OF THE INVENTION

Technical Problem

Acrylic rubbers and vulcanizates thereof have excellent physical properties including heat aging resistance, oil resistance, mechanical characteristics, and permanent compression set characteristics and thus are typically used as materials including hose members, sealing members, and rubber vibration isolator members in an automobile engine compartment.

Such members are also required to have more excellent physical properties including tensile properties and heat resistance to meet recent demands including emission controls and higher engine power.

In view of the above circumstances, the present invention is mainly intended to provide an acrylic rubber composition having sufficient tensile properties and heat resistance. The present invention is also intended to provide a cured rubber produced by curing the acrylic rubber composition.

Solution to Problem

As a result of intensive studies to solve the above problems, the inventors of the present invention have found that by finely dispersing a layered clay mineral on the nanosize level in an acrylic rubber, both tensile properties and heat resistance are achieved, and these properties can be sufficiently improved, and have completed the present invention.

In other words, the present invention provides an acrylic rubber composition comprising 1 to 25 parts by mass of a layered clay mineral relative to 100 parts by mass of an acrylic rubber and provides a vulcanizate thereof.

The acrylic rubber may be a copolymer of a (meth)acrylic acid alkyl ester and a curesite monomer.

The curesite monomer may have at least one functional group selected from an epoxy group, a carboxyl group, and an active chlorine group. The curesite monomer may be contained in an amount of 0.1 to 10% by mass relative to the total mass of the acrylic rubber.

The acrylic rubber may further contain an ethylene monomer. The ethylene monomer may be contained in an amount of 0.1 to 10% by mass relative to the total mass of the acrylic rubber.

The layered clay mineral may be montmorillonite, and the montmorillonite may contain an onium salt.

A vulcanizate produced by vulcanization of the acrylic rubber composition and a rubber hose, a sealing part, and a rubber vibration isolator produced from the vulcanizate are also provided.

Advantageous Effects of Invention

According to the present invention, an acrylic rubber composition excellent in both tensile properties and heat resistance can be provided. According to the present invention, a cured rubber produced by curing the acrylic rubber composition can also be provided.

DESCRIPTION OF EMBODIMENTS

The present invention will now be described in detail, but the invention is not intended to be limited to the following embodiments.

An acrylic rubber composition pertaining to the present invention is characterized in that a layered clay mineral is dispersed on a nano-level. In other words, the acrylic rubber composition of the present invention may contain layered clay mineral in nano sizes in a dispersed state.

Examples of the preparation method of an acrylic rubber composition in which a layered clay mineral is dispersed include, but are not necessarily limited to, emulsion polymerization in a layered clay mineral and kneading with a commonly used rubber kneader. As the rubber kneader, a roller, a kneader, a Banbury mixer, an internal mixer, a twin-screw extruder, and the like may be used.

<Acrylic Rubber>

An acrylic rubber used in the present invention will next be described. The acrylic rubber used in the present invention mainly comprises a (meth)acrylic acid alkyl ester and is a copolymer thereof with a curesite monomer. The "curesite monomer" is a monomer having a functional group to form a cure site (curing point). "Mainly comprising a (meth)acrylic acid alkyl ester" means that the total amount of monomer units derived from the (meth)acrylic acid alkyl ester is 50% by mass or more relative to the total mass of an acrylic rubber. For example, the monomer units are preferably contained in a total amount of 75% by mass to 99% by mass, more preferably 80% by mass to 98% by mass, even more preferably 85% by mass to 97% by mass, and still more preferably 90% by mass to 96% by mass. The acrylic rubber used in the present invention may be a copolymer of a (meth)acrylic acid alkyl ester with vinyl acetate or the like as needed. In other words, a vinyl acetate-copolymerized acrylic rubber or an ethylene-vinyl acetate-copolymerized acrylic rubber may be used. The acrylic rubber used in the present invention is particularly preferably a copolymer of a (meth)acrylic acid alkyl ester, a curesite monomer, and an ethylene monomer.

The (meth)acrylic acid alkyl ester is to be the skeleton of an acrylic rubber. By selecting the type thereof, original physical properties or basic properties including cold resistance and oil resistance of a resulting acrylic rubber composition can be adjusted. In the present invention, the (meth)acrylic acid alkyl ester is a synonym for a (meth)acrylate and includes both methacrylic acid alkyl esters (methacrylates) and acrylic acid alkyl esters (acrylates).

Examples of the (meth)acrylic acid alkyl ester include, but are not necessarily limited to, (meth)acrylic acid alkyl esters such as methyl (meth)acrylate, ethyl (meth)acrylate, n-propyl (meth)acrylate, n-butyl (meth)acrylate, isobutyl (meth)acrylate, n-pentyl (meth) acrylate, isoamyl (meth) acrylate, n-hexyl (meth) acrylate, 2-methylpentyl (meth) acrylate, n-octyl (meth) acrylate, 2-ethylhexyl (meth) acrylate, n-decyl (meth) acrylate, n-dodecyl (meth)acrylate, and n-octadecyl (meth)acrylate. Acrylic acid alkoxyalkyl esters such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, 2-(n-butoxy)propyl acrylate, and 2-(2-ethoxyethoxy)ethyl acrylate may also be used. These (meth)acrylic acid alkyl esters may be used singly or in combination of two or more of them.

The acrylic rubber used in the present invention may be preferably a polymer of ethyl acrylate and n-butyl acrylate as the (meth)acrylic acid alkyl ester. In other words, the acrylic rubber used in the present invention preferably contains an ethyl acrylate monomer unit and an n-butyl acrylate monomer unit and more preferably contains these monomer units as main components. In other words, the acrylic rubber composition of the present invention preferably contains an ethyl acrylate monomer unit and an n-butyl acrylate monomer unit, for example, in a total amount of 75% by mass to 99% by mass, more preferably 80% by mass to 98% by mass, even more preferably 85% by mass to 97% by mass, and still more preferably 90% by mass to 96% by mass relative to the total mass of the acrylic rubber.

For example, the acrylic rubber used in the present invention may contain an ethyl acrylate monomer unit, for example, in an amount of 40% by mass to 60% by mass, preferably 42% by mass to 55% by mass, and more preferably 44% by mass to 50% by mass relative to the total mass of the acrylic rubber, and may contain an n-butyl acrylate monomer unit, for example, in an amount of 40% by mass to 60% by mass, preferably 42% by mass to 55% by mass, and more preferably 44% by mass to 50% by mass relative to the total mass of the acrylic rubber. The content ratio of the monomer units is quantitatively determined on the basis of a nuclear magnetic resonance spectrum obtained from an acrylic rubber or an acrylic rubber composition.

By controlling the amounts of the above unsaturated monomers, cold resistance or oil resistance of a resulting acrylic rubber composition or a vulcanizate thereof can be adjusted. For example, when ethyl acrylate and n-butyl acrylate are used to produce an acrylic rubber, an increase in copolymerization proportion of n-butyl acrylate enables an improvement of cold resistance, whereas an increase in copolymerization proportion of ethyl acrylate enables an improvement of oil resistance.

The curesite monomer may be copolymerized with a (meth)acrylic acid alkyl ester as needed to advance intermolecular crosslinking, and the hardness or elongation characteristics of a resulting acrylic rubber can be controlled. The curesite monomer essentially has any one functional group of a carboxyl group, an epoxy group, and an active chlorine group. In other words, the acrylic rubber of the present invention may be an acrylic rubber having at least one group selected from a carboxyl group, an epoxy group, and an active chlorine group.

The curesite monomer is not limited to particular monomers. For example, examples of the curesite monomer having a carboxyl group include acrylic acid, methacrylic acid, crotonic acid, 2-pentenoic acid, maleic acid, fumaric acid, itaconic acid, maleic acid monoalkyl esters, fumaric acid monoalkyl esters, monocyclohexyl maleate, monocyclohexyl fumarate, and cinnamic acid. Examples of the other curesite monomer include monomers having an epoxy group, such as glycidyl acrylate, glycidyl methacrylate, allyl glycidyl ether, and methallyl glycidyl ether; and monomers having an active chlorine group, such as 2-chloroethyl vinyl ether, 2-chloroethyl acrylate, vinylbenzyl chloride, vinyl chloroacetate, and allyl chloroacetate. A single curesite monomer may be used, or a plurality of curesite monomers may be used in combination.

The curesite monomer used in the present invention is preferably a maleic acid monoalkyl ester or a fumaric acid monoalkyl ester. The carbon number of the monoalkyl group is not limited to particular values and may be, for example, preferably 1 to 8, more preferably 2 to 6, and even more preferably 3 to 5. The curesite monomer may be, for example, monobutyl maleate. In other words, the acrylic rubber of the present invention is preferably a carboxyl group-containing acrylic rubber. The carboxyl group is derived from, for example, the maleic acid monoalkyl ester or the fumaric acid monoalkyl ester.

Alternatively, the curesite monomer used in the present invention may be glycidyl acrylate or glycidyl methacrylate. The curesite monomer is more preferably glycidyl methacrylate. In other words, the acrylic rubber of the present invention is preferably an epoxy group-containing acrylic rubber. The epoxy group is derived from, for example, the glycidyl acrylate or the glycidyl methacrylate.

As mentioned above, the acrylic rubber of the present invention is preferably, for example, a copolymer of a (meth)acrylic acid alkyl ester, a curesite monomer, and an ethylene monomer. In the description, the content ratio of the curesite monomer unit is preferably 0.1% by mass to 10% by mass relative to the total mass of the acrylic rubber. The content ratio is more preferably 0.5% by mass to 10% by mass, even more preferably 1% by mass to 5% by mass, and still more preferably 1% by mass to 4% by mass. If the content of the curesite monomer is less than 0.1% by mass, a vulcanizate may have insufficient strength. If the content of the curesite monomer is more than 10% by mass, a vulcanizate may harden to lose rubber elasticity.

For a curesite monomer having a carboxyl group, the quantitative determination of the monomer unit is performed by dissolution of a raw rubber of a copolymer in toluene and subsequent neutralization titration of the solution with potassium hydroxide. For a curesite monomer having an epoxy group, the quantitative determination is performed by dissolution of a raw rubber of a copolymer in chloroform and subsequent titration with a perchloric acid-acetic acid solution. For a curesite monomer having an active chlorine group, the quantitative determination is performed by decomposition by oxygen flask combustion method and subsequent titration of the product with silver nitrate.

When only a curesite monomer having a carboxyl group is used as the curesite monomer, the content ratio of the curesite monomer unit is the content ratio of the curesite monomer having a carboxyl group. When a curesite monomer having an epoxy group and an additional curesite monomer are used as the curesite monomer, the content ratio is the total content ratio of the curesite monomer having an epoxy group and the additional curesite monomer.

In the acrylic rubber, an additional monomer copolymerizable with the (meth)acrylic acid alkyl ester, the curesite monomer, or vinyl acetate may be copolymerized as long as the object of the present invention is not impaired. Examples of the additional copolymerizable monomer include, but are not necessarily limited to, alkyl vinyl ketones such as vinyl acetate and methyl vinyl ketone; vinyl ethers and allyl ethers such as vinyl ethyl ether and allyl methyl ether; vinyl aromatic compounds such as styrene, α-methylstyrene, chlorostyrene, vinyltoluene, and vinylnaphthalene; vinyl nitriles such as acrylonitrile and methacrylonitrile; and ethylenically unsaturated compounds such as acrylamide, propylene, butadiene, isoprene, pentadiene, vinyl chloride, vinylidene chloride, vinyl fluoride, vinylidene fluoride, ethylene, and vinyl propionate.

In the acrylic rubber used in the present invention, an ethylene monomer is also preferably polymerized in addition to the (meth)acrylic acid alkyl ester and the curesite monomer. By copolymerization of ethylene, an acrylic rubber having a markedly improved strength can be produced. The content ratio of the ethylene monomer unit is preferably 0.1% by mass to 10% by mass, more preferably 0.5% by mass to 5% by mass, and even more preferably 1% by mass to 3% by mass relative to the total mass of the acrylic rubber. If the content ratio is less than 0.1% by mass, the strength may be insufficient. If the content ratio is more than 10% by mass, the oil resistance may markedly deteriorate.

The content ratio of the ethylene monomer unit is quantitatively determined on the basis of a nuclear magnetic resonance spectrum obtained from an acrylic rubber or an acrylic rubber composition.

In particular, when the acrylic rubber is copolymerized with ethylene, for example, 10 parts by mass or less of the ethylene monomer may be preferably copolymerized relative to 100 parts by mass of the acrylic rubber. If the amount is more than 10 parts by mass, the oil resistance may markedly deteriorate.

The acrylic rubber may be produced through copolymerization of the above monomers by a known method including emulsion polymerization, suspension polymerization, solution polymerization, and bulk polymerization. The production method of the acrylic rubber may be appropriately selected by a person skilled in the art.

<Acrylic Rubber Composition>

An acrylic rubber composition pertaining to the present invention will next be described.

As described above, the acrylic rubber composition pertaining to the present invention comprises the acrylic rubber and a layered clay mineral.

Examples of the layered clay mineral used in the present invention include, but are not necessarily limited to, smectite clay minerals such as montmorillonite, hectorite, and saponite. Of them, montmorillonite is preferably used.

Examples of the cation in the layered clay mineral include, but are not necessarily limited to, a sodium salt, a calcium salt, and an onium salt. Of them, an onium salt is preferred. This cation suppresses aggregation of the layered clay mineral and enables uniform dispersion of the layered clay mineral on a nano-level in the acrylic rubber composition.

Examples of the onium salt include, but are not necessarily limited to, quaternary ammonium salts and quaternary phosphonium salts. Examples of the quaternary ammonium salt include tetramethylammonium chloride, tetrabutylammonium chloride, tetramethylammonium bromide, tetrabutylammonium bromide, decyltrimethylammonium chloride, and bis(hydrogenated tallow)dimethylammonium chloride. Examples of the quaternary phosphonium salt include tetraphenylphosphonium chloride, benzyltriphenylphosphonium chloride, tetraphenylphosphonium bromide, and tetramethylphosphonium tetraphenylborate.

The content ratio of the layered clay mineral is preferably 1 to 25 parts by mass, more preferably 4 to 25 parts by mass, even more preferably 8 to 20 parts by mass, still more preferably 12 to 20 parts by mass, and most preferably 16 to 20 parts by mass relative to 100 parts by mass of the acrylic rubber. If the content ratio is less than 1 part by mass, the strength improvement effect may not be exerted. If the content ratio is more than 25 parts by mass, the elongation may markedly deteriorate.

The acrylic rubber composition may further contain a vulcanizing agent or a vulcanization accelerator.

The vulcanizing agent may be any agent commonly used for vulcanization of an acrylic rubber composition and is not necessarily limited. For example, when the curesite monomer is a monomer having a carboxyl group, the vulcanizing agent is preferably a polyamine compound, and a vulcanizing system containing a guanidine compound is particularly preferably used. When the curesite monomer is a monomer having an epoxy group, the vulcanizing agent is preferably an imidazole compound.

Examples of the polyamine compound include aromatic polyamine compounds such as 4,4'-bis(4-aminophenoxy) biphenyl, 4,4'-diaminodiphenyl sulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy) phenyl]propane, 2,2-bis[4-(4-aminophenoxy)phenyl] sulfone, 4,4'-diaminodiphenyl sulfone, bis[4-(3-aminophenoxy)phenyl]sulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide, bis[4-(4-aminophenoxy)phenyl] sulfone, and 4,4'-bis(α,α-dimethylbenzyl)diphenylamine; and aliphatic polyamine compounds such as hexamethylenediamine, hexamethylenediamine carbamate, N,N'-dicinnamylidene-1,6-hexanediamine, diethylenetriamine, triethylenetetramine, and tetraethylenepentamine.

Examples of the guanidine compound include guanidine, tetramethylguanidine, dibutylguanidine, diphenylguanidine, and di-o-tolylguanidine.

Examples of the imidazole compound include 1-methylimidazole, 1,2-dimethylimidazole, 1-methyl-2-ethylimidazole, 1-benzyl-2-methylimidazole, 1-benzyl-2-ethylimidazole, 1-benzyl-2-ethyl-5-methylimidazole, 1-benzyl-2-phenylimidazole, 1-benzyl-2-phenylimidazole trimellitic acid salt, 1-aminoethylimidazole, 1-aminoethyl-2-methylimidazole, 1-aminoethyl-2-ethylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecyl-imidazole trimellitate, 2,4-diamino-6-

[2'-methylimidazolyl-(1)']ethyl-s-triazine/isocyanuric acid adduct, 1-cyanoethyl-2-phenyl-4,5-di-(cyanoethoxymethyl) imidazole, N-(2-methylimidazolyl-1-ethyl)urea, N,N'-bis-(2-methylimidazolyl-1-ethyl)urea, 1-(cyanoethylamino-ethyl)-2-methylimidazole, N,N'-[2-methylimidazolyl-(1)-ethyl]-adipoyl diamide, N,N'-[2-methylimidazolyl-(1)-ethyl]-dodecanedioyl diamide, N,N'-[2-methylimidazolyl-(1)-ethyl]-eicosanedioyl diamide, 2,4-diamino-6-[2'-methylimidazolyl-(1)']-ethyl-s-triazine, 2,4-diamino-6-[2'-undecylimidazolyl-(1)']-ethyl-s-triazine, 1-dodecyl-2-methyl-3-benzylimidazolium chloride, and 1,3-dibenzyl-2-methylimidazolium chloride.

The content of the vulcanizing agent is not limited to particular values and is preferably 0.1 to 10 parts by mass and more preferably 0.3 to 5 parts by mass relative to 100 parts by mass of the acrylic rubber. When the content is within the range, necessary and sufficient vulcanization treatment can be performed.

The vulcanization accelerator may be added in order to control the vulcanization rate. Specific examples of the vulcanization accelerator include, but are not necessarily limited to, curing agents for epoxy resins, such as pyrolytic ammonium salts, organic acids, acid anhydrides, amines, sulfur, and sulfur compounds. The vulcanization accelerator may be added at such a content as not to impair characteristics of a vulcanizate produced from the acrylic rubber composition in the present invention.

The vulcanizate of the acrylic rubber composition of the present invention is produced by kneading the acrylic rubber composition, a vulcanizing agent, a vulcanization accelerator, and the like at a temperature not higher than a vulcanization temperature. The acrylic rubber composition of the present invention may be molded into various intended shapes and then be vulcanized into a vulcanizate, or may be vulcanized and then be molded into various intended shapes. The vulcanization temperature may be appropriately set depending on mixing ratios of components in the acrylic rubber composition or a type of the vulcanizing agent, and is typically 100 to 200° C. and preferably 130 to 180° C. The time for vulcanization is 1 to 10 hours and preferably 2 to 6 hours.

Apparatuses for kneading, molding, or vulcanizing the acrylic rubber composition and apparatuses for kneading or molding a vulcanizate of the acrylic rubber composition may be those commonly used in the rubber industry.

The acrylic rubber composition may contain a filler, a reinforcing agent, a plasticizer, a lubricant, an age inhibitor, a stabilizer, a silane coupling agent, and the like depending on intended practical use.

As the filler or the reinforcing agent, fillers or reinforcing agents used for common rubber applications may be added, and examples include fillers or reinforcing agents, such as carbon blacks, silicas, talcs, and calcium carbonates. The total amount of such additives is preferably 20 to 100 parts by mass relative to 100 parts by mass of the acrylic rubber composition.

As the plasticizer, plasticizers used for common rubber applications may be added, and examples include ester plasticizers, polyoxyethylene ether plasticizers, and trimellitate plasticizers. The amount of the plasticizer is preferably about 50 parts by mass or less relative to 100 parts by mass of the acrylic rubber composition.

A laminate and a vulcanizate thereof of the present invention are suitably used specifically as rubber hoses, sealing parts such as gaskets and packings, and rubber vibration isolators. In other words, the present invention provides a rubber hose, a sealing part, or a rubber vibration isolator comprising the vulcanizate of the present invention. The rubber hose, the sealing part, and the rubber vibration isolator may be composed of only the acrylic rubber composition of the present invention or only the vulcanizate thereof, or may be a combination with other parts.

Examples of the rubber hose include transmission oil cooler hoses, engine oil cooler hoses, air duct hoses, turbo intercooler hoses, hot air hoses, radiator hoses, power steering hoses, fuel system hoses, and drain system hoses in automobiles, construction machinery, or hydraulic machines.

As the structure of the rubber hose, reinforcing yarns or wires may be provided inside a hose or on the outermost layer of a rubber hose as commonly performed.

Examples of the sealing part include engine head cover gaskets, oil pan gaskets, oil seals, lip seal packings, O-rings, transmission seal gaskets, crank shafts, cam shaft seal gaskets, valve stems, power steering seal belt cover seals, boot materials for constant velocity joints, and rack and pinion boot materials.

Examples of the rubber vibration isolator include damper pulleys, center support cushions, and suspension bushes.

Examples

The present invention will next be described in further detail with reference to examples, but the invention is not intended to be limited by the examples.

Acrylic rubbers A and B were produced in the conditions shown below.

<Acrylic Rubber A>

In a pressure-resistant reaction container having an internal volume of 40 liters, 5.6 Kg of ethyl acrylate, 5.6 Kg of n-butyl acrylate, 560 g of monobutyl maleate, 17 Kg of 4% by mass aqueous solution of partially saponified polyvinyl alcohol, and 22 g of sodium acetate were placed, and the whole was thoroughly stirred with a stirrer in advance, giving a homogeneous suspension. The air in the upper part of the container was replaced with nitrogen, then ethylene was injected under pressure into the upper part of the container, and the pressure was adjusted at 3.5 MPa. Under stirring, the temperature in the container was maintained at 55° C., and an aqueous t-butyl hydroperoxide solution (0.25% by mass, 2 liters) was separately injected under pressure from an inlet to start polymerization. The temperature in the container during the reaction was maintained at 55° C., and the reaction was completed after 6 hours. To the resulting polymerization liquid, an aqueous sodium borate solution (3.5% by mass, 7 liters) was added to solidify the polymer, and the polymer was dehydrated and dried to give an acrylic rubber A.

As the copolymer composition of the acrylic rubber A, the ethylene monomer unit was 2.0% by mass, the monobutyl maleate monomer unit was 3.5% by mass, the ethyl acrylate monomer unit was 47.5% by mass, and the n-butyl acrylate monomer unit was 47.0% by mass. The quantitative determination of the monobutyl maleate monomer unit was performed by dissolution of a raw rubber of the copolymer in toluene and subsequent neutralization titration with potassium hydroxide. The other monomer units were quantitatively determined from nuclear magnetic resonance spectra of the respective components.

<Acrylic Rubber B>

The same procedure as for the acrylic rubber A was performed except that 150 g of glycidyl methacrylate was used in place of monobutyl maleate to start polymerization, giving an acrylic rubber B.

As the copolymer composition of the acrylic rubber B, the ethylene monomer unit was 2.0% by mass, the glycidyl methacrylate monomer unit was 3.5% by mass, the ethyl acrylate monomer unit was 47.5% by mass, and the n-butyl acrylate monomer unit was 47.0% by mass. The quantitative determination of the glycidyl methacrylate monomer was performed by dissolution of a raw rubber of the copolymer in chloroform and subsequent titration with a perchloric acid-acetic acid solution. The other copolymer composition was quantitatively determined from nuclear magnetic resonance spectra of each component.

<Preparation of Acrylic Rubber Composition>

The acrylic rubber produced by the above method was kneaded with a 6-inch open roll in accordance with a formulation in Table 1, and was extruded into a sheet having a thickness of 2.4 mm. The sheet was subjected to press vulcanization at 170° C. for 50 minutes with a press vulcanizer.

Reagents described in Table 1 are as shown below.

Stearic acid: Lunac S-90 manufactured by Kao Corporation

Stearylamine: Farmin 80 manufactured by Kao Corporation

Liquid paraffin: HICALL K-230 manufactured by Kaneda Co., Ltd.

Age inhibitor: NAUGARD 445 manufactured by Uniroyal (4,4'-bis(α,α-dimethylbenzyl)diphenylamine)

KA-4: 2,2-bis[4-(4-aminophenoxy)phenyl]propane manufactured by Wakayama Seika Kogyo Co., Ltd.

XLA-60: vulcanization accelerator manufactured by Lanxess

Montmorillonite (Na salt): Cloisite-Na+ manufactured by Southern Clay Products

Montmorillonite (Ca salt): Cloisite-Ca++ manufactured by Southern Clay Products

Montmorillonite (onium salt): Cloisite-30B manufactured by Southern Clay Products The onium salt of montmorillonite is a bis(hydrogenated tallow)dimethylammonium cation.

<Test Method of Physical Properties>

The tensile strength, the elongation at break, and the heat resistance of the produced acrylic rubber compositions were evaluated in the following conditions.

(1) Tensile Strength/Elongation at Break

Measurement was performed in accordance with ASTM D 412-98.

(2) Heat Resistance Test

An apparatus for thermogravimetry was used to heat about 10 mg of a sample to 600° C. at a temperature increase rate of 20° C./min under a nitrogen atmosphere (nitrogen flow rate: 35 mL/min), and a temperature at which the sample weight decreased by 5% was determined as the decomposition temperature. The measurement results of Examples and Comparative Example are shown in Table 1.

TABLE 1

|  |  | Example 1 | Example 2 | Example 3 | Example 4 | Example 5 | Example 6 | Example 7 |
|---|---|---|---|---|---|---|---|---|
| Formulation (parts by weight) | Acrylic rubber A (containing a carboxyl group) | 100 | 100 | 100 | 100 | 100 | 100 | — |
|  | Acrylic rubber B (containing an epoxy group) | — | — | — | — | — | — | 100 |
|  | Stearic acid | 1 | 1 | 1 | 1 | 1 | 1 | 1 |
|  | Stearylamine | 0.3 | 0.3 | 0.3 | 0.3 | 0.3 | 0.3 | 0.3 |
|  | Liquid paraffin | 1 | 1 | 1 | 1 | 1 | 1 | 1 |
|  | Age inhibitor | 1 | 1 | 1 | 1 | 1 | 1 | 1 |
|  | KA-4 | 1 | 1 | 1 | 1 | 1 | 1 | 1 |
|  | XLA-60 | 1 | 1 | 1 | 1 | 1 | 1 | 1 |
|  | Montmorillonite (Na salt) | — | — | — | — | — | — | — |
|  | Montmorillonite (Ca salt) | — | — | — | — | — | — | — |
|  | Montmorillonite (onium salt) | 1 | 4 | 8 | 12 | 16 | 20 | 8 |
| Physical property evaluation | Tensile strength (MPa) | 0.98 | 1.47 | 2.17 | 3.41 | 4.21 | 5.01 | 2.13 |
|  | Elongation (%) | 687 | 716 | 780 | 785 | 778 | 775 | 784 |
|  | 5% Weight loss temperature (° C.) | 367 | 386 | 402 | 406 | 409 | 410 | 399 |

|  |  | Example 8 | Example 9 | Example 10 | Example 11 | Example 12 | Comparative Example 1 |
|---|---|---|---|---|---|---|---|
| Formulation (parts by weight) | Acrylic rubber A (containing a carboxyl group) | — | — | 100 | 100 | 100 | 100 |
|  | Acrylic rubber B (containing an epoxy group) | 100 | 100 | — | — | — | — |
|  | Stearic acid | 1 | 1 | 1 | 1 | 1 | 1 |
|  | Stearylamine | 0.3 | 0.3 | 0.3 | 0.3 | 0.3 | 0.3 |
|  | Liquid paraffin | 1 | 1 | 1 | 1 | 1 | 1 |
|  | Age inhibitor | 1 | 1 | 1 | 1 | 1 | 1 |
|  | KA-4 | 1 | 1 | 1 | 1 | 1 | 1 |
|  | XLA-60 | 1 | 1 | 1 | 1 | 1 | 1 |
|  | Montmorillonite (Na salt) | — | — | 4 | — | — | — |
|  | Montmorillonite (Ca salt) | — | — | — | 4 | — | — |
|  | Montmorillonite (onium salt) | 16 | 20 | — | — | 25 | — |
| Physical property evaluation | Tensile strength (MPa) | 4.18 | 4.94 | 1.25 | 1.27 | 5.42 | 0.26 |
|  | Elongation (%) | 783 | 778 | 710 | 708 | 730 | 402 |
|  | 5% Weight loss temperature (° C.) | 405 | 407 | 363 | 364 | 414 | 350 |

As apparent from Table 1, the acrylic rubber compositions in Examples 1 to 12 produced by adding montmorillonite have excellent tensile properties, mechanical strength, and heat resistance. It is also revealed that when the content of montmorillonite is more than 20 parts, the tensile properties greatly deteriorate.

Comparative Example 1 has the same formulation as in Example 1 except no montmorillonite is contained but has a particularly low tensile strength, a poor elongation, and a comparatively low 5% weight loss temperature as compared with the physical property evaluation in Example 1 to Example 12.

As shown by the comparison between Examples and Comparative Example, the acrylic rubber composition of the present invention has excellent rubber physical properties particularly in tensile properties and heat resistance.

The invention claimed is:

1. An acrylic rubber composition comprising 1 to 25 parts by mass of a layered clay mineral relative to 100 parts by mass of an acrylic rubber,
wherein the layered clay mineral is montmorillonite containing an onium salt selected from the group consisting of quaternary ammonium salts and quaternary phosphonium salts,
wherein the quaternary ammonium salts comprise tetramethylammonium chloride, tetrabutylammonium chloride, tetramethylammonium bromide, tetrabutylammonium bromide, decyltrimethylammonium chloride, and bis(hydrogenated tallow)dimethylammonium chloride.

2. The acrylic rubber composition according to claim 1, wherein the acrylic rubber is a copolymer of a (meth)acrylic acid alkyl ester and a curesite monomer.

3. The acrylic rubber composition according to claim 2, wherein the curesite monomer has at least one functional group selected from an epoxy group, a carboxyl group, and an active chlorine group.

4. The acrylic rubber composition according to claim 2, wherein the curesite monomer is contained in an amount of 0.1 to 10% by mass relative to a total mass of the acrylic rubber.

5. The acrylic rubber composition according to claim 1, wherein the acrylic rubber further contains an ethylene monomer.

6. The acrylic rubber composition according to claim 5, wherein the ethylene monomer is contained in an amount of 0.1 to 10% by mass relative to a total mass of the acrylic rubber.

7. The acrylic rubber composition according to claim 1, wherein the acrylic rubber contains an ethyl acrylate monomer unit in an amount of 40% by mass to 60% by mass relative to a total mass of the acrylic rubber, and an n-butyl acrylate monomer unit in an amount of 40% by mass to 60% by mass relative to the total mass of the acrylic rubber.

8. The acrylic rubber composition according to claim 1, wherein the quaternary phosphonium salts comprises tetraphenylphosphonium chloride, benzyltriphenylphosphonium chloride, tetraphenylphosphonium bromide, and tetramethylphosphonium tetraphenylborate.

9. A vulcanizate produced by vulcanization of the acrylic rubber composition according to claim 1.

10. A rubber hose comprising the vulcanizate according to claim 9.

11. A sealing part comprising the vulcanizate according to claim 9.

12. A rubber vibration isolator comprising the vulcanizate according to claim 9.

* * * * *